United States Patent [19]

Baversten et al.

[11] Patent Number: 5,343,584
[45] Date of Patent: Sep. 6, 1994

[54] NUCLEAR REACTOR PRESSURE VESSEL AND HEAD FLANGE POLISHER

[75] Inventors: Bengt I. Baversten, Weatogue, Conn.; Rolf Petersson, Vasteras, Sweden

[73] Assignee: Combustion Engineering, Inc., Conn.

[21] Appl. No.: 54,268

[22] Filed: Apr. 30, 1993

[51] Int. Cl.5 .......................... B08B 1/04; A46B 13/02
[52] U.S. Cl. ........................ 15/97.1; 15/21.1; 15/88.4; 15/246; 451/441; 451/439
[58] Field of Search ............ 15/21.1, 88.4, 97.1, 15/301, 246, 246.5; 51/241 A, 241 B, 241 S

[56] References Cited

U.S. PATENT DOCUMENTS

| | | | |
|---|---|---|---|
| 3,296,748 | 1/1967 | Talley | 15/21.1 |
| 3,922,748 | 12/1975 | Ritz | 51/241 B |
| 4,514,933 | 5/1985 | Baskett | 15/88.4 |
| 4,934,012 | 6/1990 | Gemma | 15/88.4 |

FOREIGN PATENT DOCUMENTS

| | | |
|---|---|---|
| 0505298 | 9/1992 | European Pat. Off. |
| 2049303 | 3/1971 | France |
| 2651709 | 3/1991 | France |

Primary Examiner—Edward L. Roberts
Attorney, Agent, or Firm—Ronald P. Kananen; John H. Mulholland

[57] ABSTRACT

A polisher is supported on either a frame/arm arrangement or on a vehicle which is guided by track, and is arranged to be energized to polish a predetermined surface of an annular flange or the like, when relative movement is sensed between the polishing element and the surface to be polished. The polishing arrangement can be motor driven so that the polisher can be left to polish the surface in the absence of an operator.

12 Claims, 7 Drawing Sheets

NUCLEAR REACTOR PRESSURE VESSEL AND HEAD FLANGE POLISHER

BACKGROUND OF THE INVENTION

1. Field of the Invention

The present invention relates generally to a seal polishing device. More specifically, this invention relates to a polishing arrangement for the flanges on the heads and vessels of a nuclear reactor. Still more particularly, this invention relates to an apparatus for polishing an annular flange using a relative motion detection.

2. Description of the Related Art

An interface defined between a nuclear reactor vessel and a head which closes the vessel is sealed by metallic O-rings which are disposed between the vessel flange and the vessel head flange. The vessel head flange is usually provided with grooves for receiving the O-rings. On the other hand, the flange on the vessel is usually flat. Thus, O-Rings are installed each time the reactor vessel is opened for refueling.

While the vessel is open, the sealing surfaces are carefully cleaned to remove oxide particles remaining from the former O-rings before the new O-rings are installed and the reactor vessel is closed again. Failure to adequately clean the flange/groove surfaces may lead to leakage and a need to remove the vessel head again.

Closure and hydro tests of the reactor pressure vessel are normally performed during outage critical time following the closure of the vessel. These tests require time and effort and accordingly, undesirable costs are incurred in addition to prolonged down time, in the event that the reactor vessel has to be opened again because of leakage.

The cleaning of the surfaces is usually carried out by hand. The surfaces are difficult to reach and the environment in which they are located demands that the operators use respirators and protective garb. Accordingly, as the operator's visibility is inevitably reduced by the protective suiting/respirator apparatus, it very difficult for the operator to observe accurately the surfaces which are being cleaned. These handicaps often result in the surfaces being cleaned to a bare minimum and invite the above mentioned leakage problems.

SUMMARY OF THE INVENTION

It is an object of the present invention to provide a flange polishing arrangement which enables the reactor pressure vessel (RPV) and head flange sealing surfaces to be polished to a bright clean condition without unevenness which tends to result from hand polishing techniques.

It is a further object of the present invention to provide a flange polishing arrangement which enables the polishing to be carried out under the control of servo mechanisms and therefore minimizes the amount of time the operators must spend in close proximity to radioactive surfaces In brief, the above objects are achieved by an arrangement wherein a polisher is supported on either a frame and arm arrangement or on a trolley-like vehicle which is guided by a track, and is arranged to be energized to polish a predetermined surface of a flange or the like, as long as relative movement is sensed between the polishing element and the surface. The polishing arrangement can be propelled along the flange by a motor or motors and thus enable the polisher to be left to polish the surface in the absence of an operator.

More specifically, a first aspect of the invention resides in a circular flange polishing arrangement which features: a selectively energizable polishing means; guide means for guiding the polishing means in a predetermined manner with respect to a surface of the flange which requires polishing; and means for sensing movement of the polishing element relative to the polished surface and for enabling the polishing element to be energized as long as relative movement is detected.

A second aspect of the present invention resides in an annular flange polishing arrangement which features: an essentially triangular frame having first, second and third apexes, the frame being so dimensioned that when disposed in an operative relationship with respect to the annular flange, the first, second and third apexes are located proximate and/or over the annular flange. First and second support means are disposed at each of the first and second apexes, respectively, for supporting the frame on the annular flange, while a polishing means is disposed at the third apex of the frame. Sensing means are provided to sense the relative movement between the frame and the annular flange and to selectively energize and/or maintain the energization of the polishing means in response to the detection of relative movement between the polishing means and the annular frame.

A third aspect of the invention resides in an annular flange polishing arrangement comprising: a stationary support; an arm pivotally supported on the support; polishing means mounted proximate the free end of the arm for polishing a surface of the annular flange; and biasing means associated with the arm for biasing the polishing means into engagement with the surface of the annular flange to be polished.

A further aspect of the present invention resides in an annular flange polishing arrangement which features: a track which is supported on a plurality of pedestals used to support a member on which the flange is formed; a vehicle which is guided by the track so as to follow the flange; polishing means supported on the vehicle so as to engage a surface of the flange which is to be polished; and means included in at least one of the vehicle and the polishing means for sensing the movement of the vehicle with respect to the flange and for permitting the polishing means to be energized to polish the surface of the flange.

With the above type of polishing arrangements, the treated surfaces are easy to inspect since flaws are clearly visible on the otherwise smooth and shiny surfaces.

As noted above, the polishing apparatus is preferably provided with a sensor arrangement which detects relative movement between the polisher and the surface to be polished. This arrangement ensures that the polisher will not stand still and excessively polish a localized area on the flange. This sensor arrangement advantageously takes the form of a rotation sensor which is associated with one of the non-driven support wheels or rollers provided on the apparatus. Therefore, the polisher will be stopped if the wheel or roller is sensed as not rotating for a predetermined time, (thus indicating that the polisher is not moving along the surface).

DETAILED DESCRIPTION OF THE PREFERRED EMBODIMENTS

FIGS. 1 to 4 show an RPV flange polisher according to a first embodiment of the present invention. This embodiment features a triangular frame 1 with an oscillating polisher 2 mounted at one of its apexes. Support rollers 3 are provided at the other two apexes in the manner illustrated in FIG. 4. The support rollers 3 are arranged to roll along the surface of the flange which requires polishing as will be evident from FIG. 4. Simply by way of example, the surface in this instance is about 4" wide and is located on a flange having a 5" width, thus leaving only a slight working margin.

Figure 1:
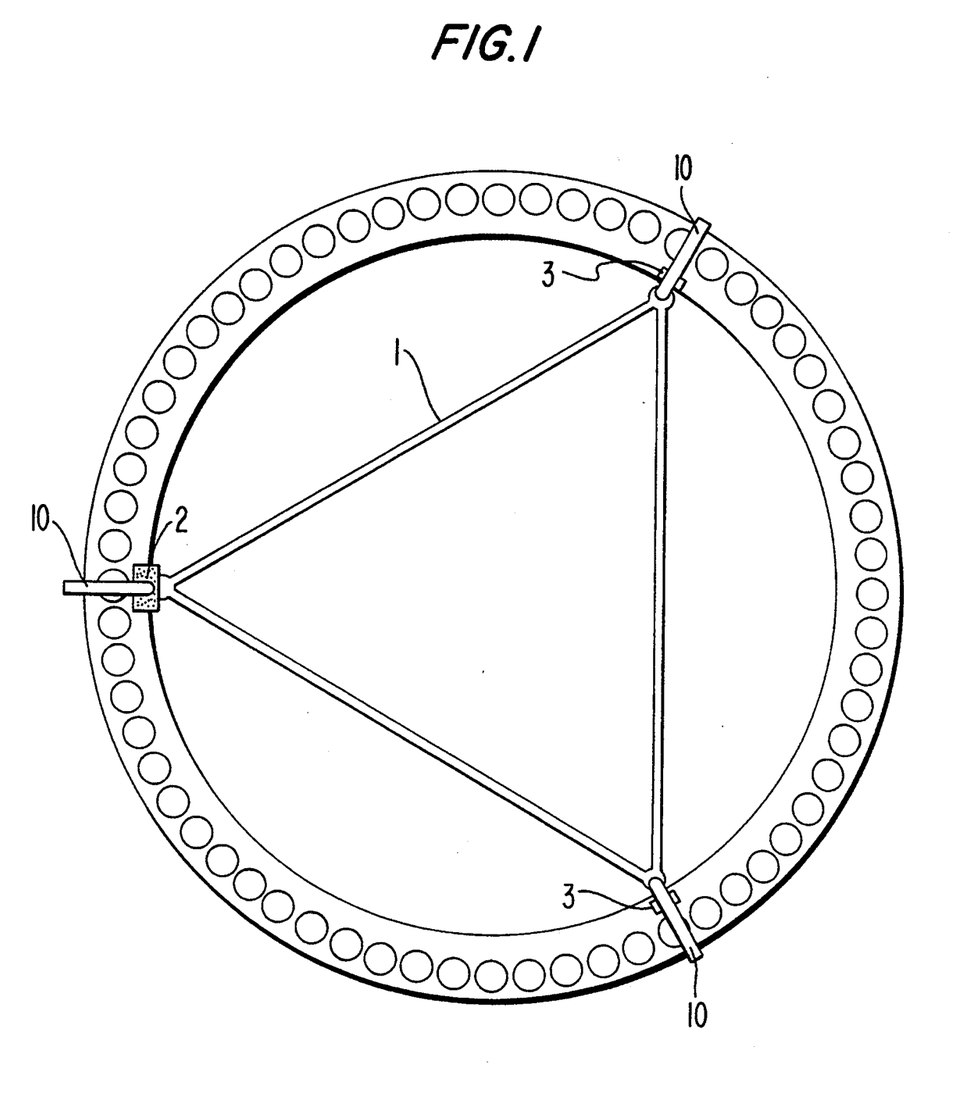
FIG. 1 is a plan view of an open pressure vessel showing a polishing arrangement according to a first embodiment of the present invention, disposed in an operative position.
Figure 2:
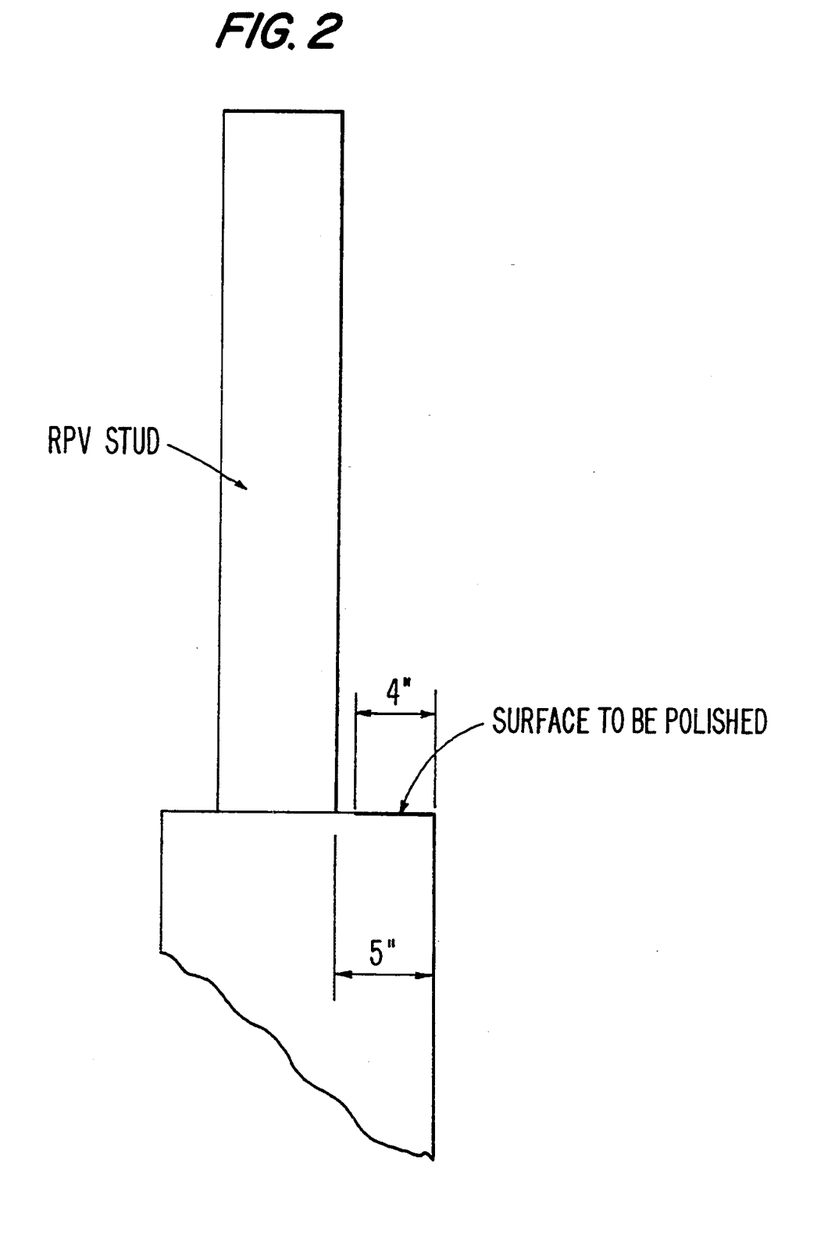
FIG. 2 is a elevational view showing a relationship which exists between the studs of the pressure vessel and the surface area of flange which is to be polished by the first embodiment of the invention.
Figure 3:
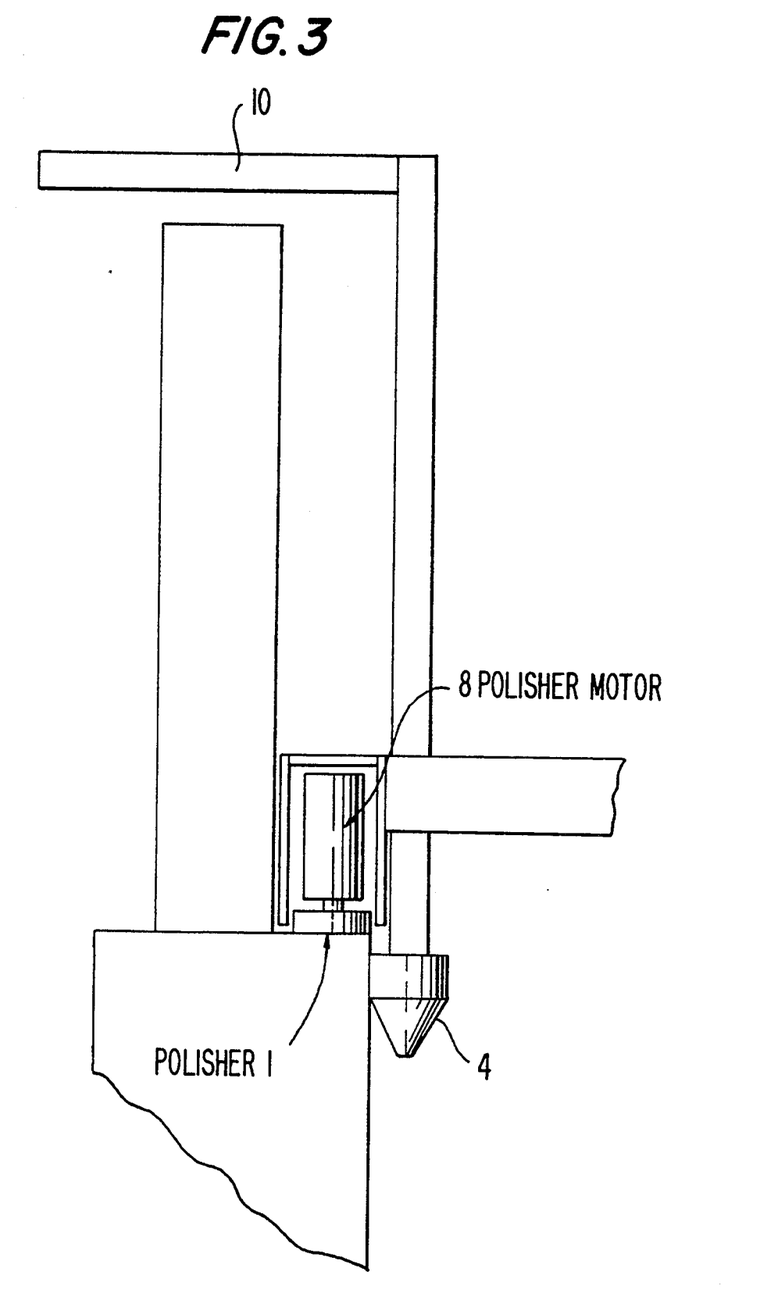
FIG. 3 is an elevational view similar to the one shown in FIG. 2 and which shows an apex of the triangular frame (shown in FIG. 1) on which a polishing device is mounted.
Figure 4:
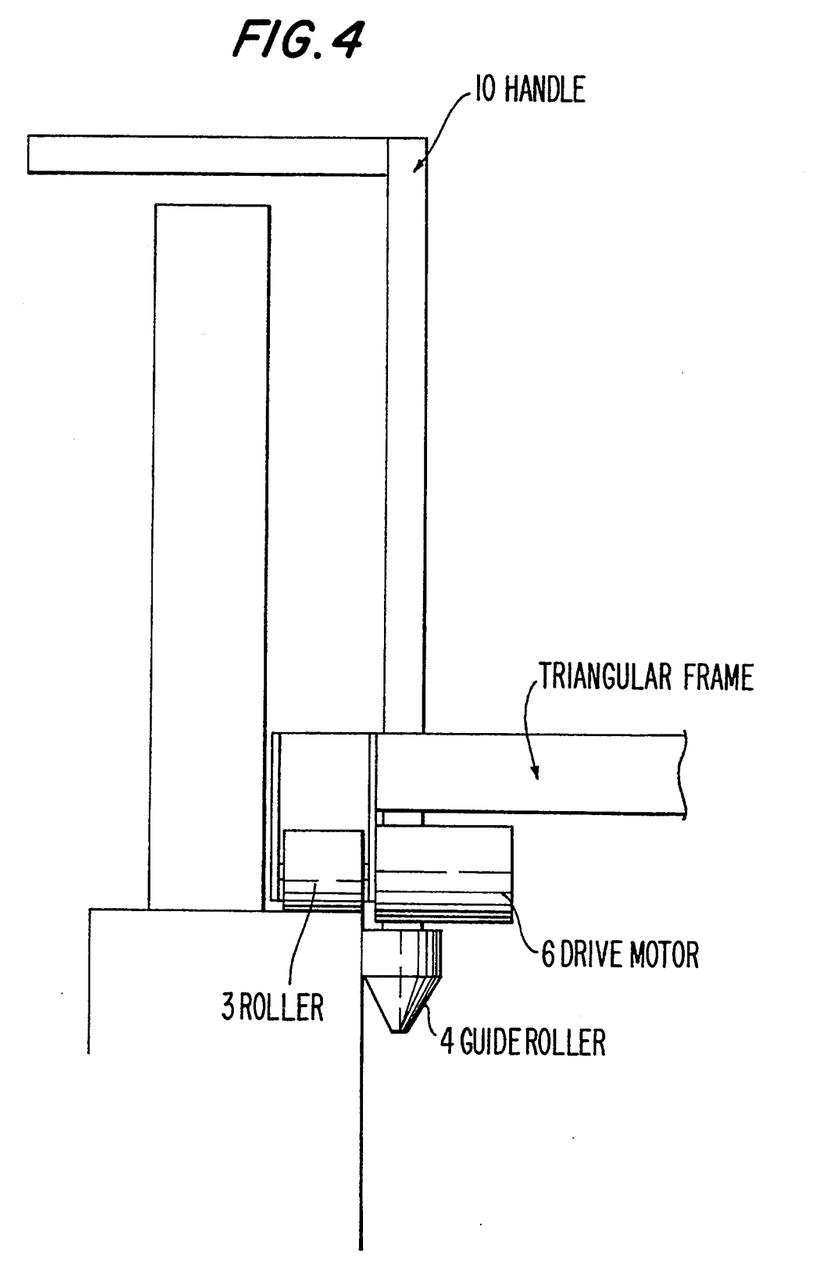
FIG. 4 is an elevational view similar to the one shown in FIG. 3 and which shows an apex of the triangular frame (shown in FIG. 1) on which a support roller is formed.

Guide rollers 4 are additionally disposed at each of the three apexes. The guide rollers 4 are arranged so that each has a vertical axis of rotation and each engages a curved vertical wall surface defined immediately adjacent an inner peripheral edge of the flange. The provision of these guide rollers 4 attenuates the radial movement of the polisher 1 with respect to the horizontal annular surface to be polished.

Although only one is shown in this embodiment, two or more oscillating polishers can be supported on the frame if desired. In this instance, the support roller or rollers 3 which are provided at the other two apexes would be replaced or supplemented by these units.

In the illustrated embodiment, at least one of the support rollers 3 is in a drive connection with a drive motor 6. Energization of the motor 6 induces the rotation of the triangular frame and moves the polisher 1 along the flange.

In order to ensure that the flange is uniformly polished, it is preferred that one of the rollers (either a support roller 3 or a guide roller 4) which is not directly driven, be used in conjunction with a rotation sensor to detect rotation of the frame. In accordance with the present invention, the polisher motor 8 is not energized until a frame rotation is indicated by the output of the rotation sensor. This of course prevents localized abrasion and maintains the flange in the optimum condition.

An alternative arrangement could be that the polisher motor will not be allowed to continue operation for more than a predetermined period after the rotation sensor output is no longer generated. For example, if no indication of frame rotation is generated for more than a predetermined short period of time (e.g. 1.0–1.5 seconds), the power to the polisher motor 8 will be cutoff and a manual restart be required.

Although not shown in these drawings, a vacuum hose will be provided to remove any particulate matter which is produced/dislodged during the polishing operation.

During operation, the frame is lowered onto the flange inside the vessel studs, and rotated either by the servo device (i.e. drive motor/support roller 3) or by hand. In this connection, suitable grip-like handle members 10 are provided at each of the frame apexes. When the movement of the frame is induced by hand, the rotation sensor output will allow power to be supplied to the drive motor or motors 6 and to the polisher motor 8. Following this, the polisher can be left rotating about the flange until such time as inspection indicates that the flange has been cleaned to the required degree. This of course can be readily ascertained visually or alternative by some suitable scanning/camera technique.

Figure 5:
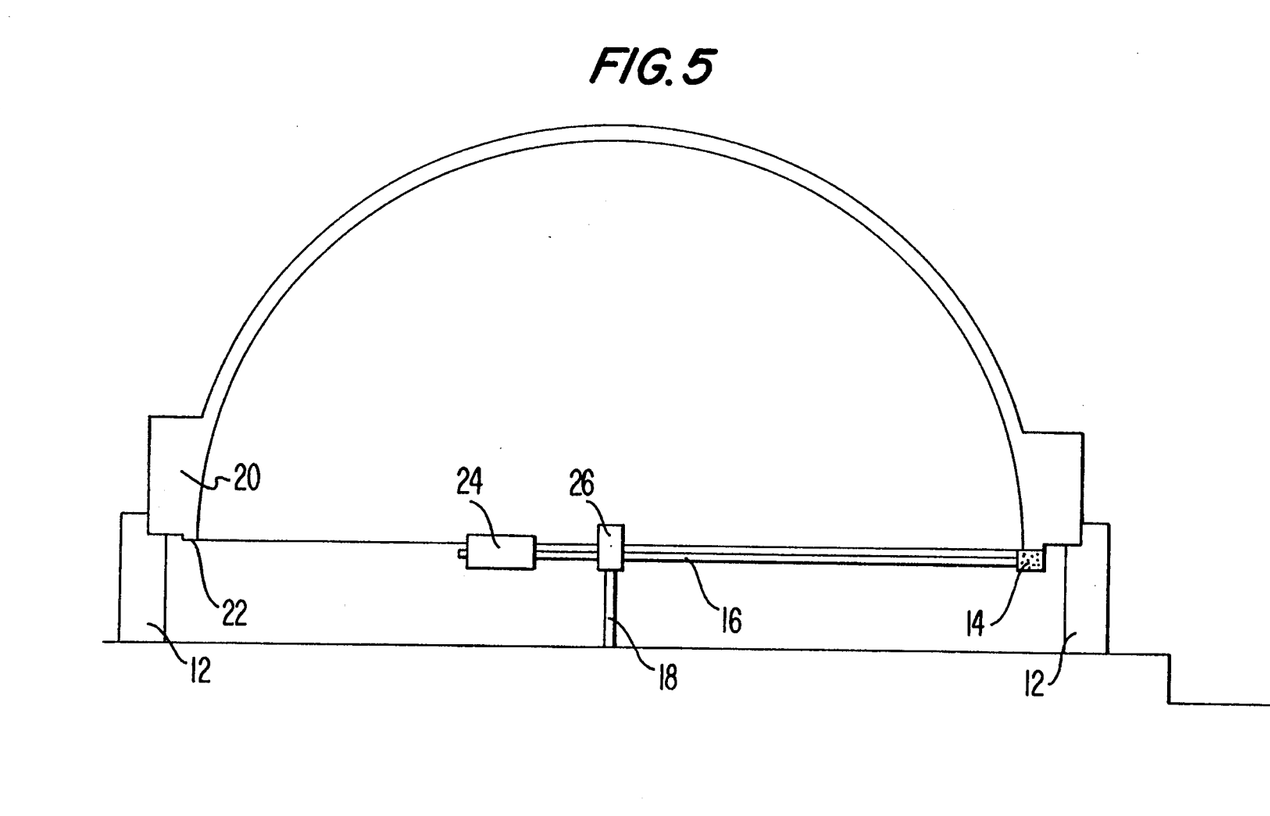
FIG. 5 is an elevational view schematically showing a swing-arm type polishing arrangement according to a second embodiment of the invention which is used to polish the flange of the head while it is supported on pedestals.

FIG. 5 shows a second embodiment of the present invention. This embodiment is directed to polishing the flange on the head and is designed to carry out this task while the head is off the pressure vessel and temporarily supported on head support pedestals 12.

A polishing device 14 is supported on an arm 16 which extends from a stationary support 18 disposed coaxially with respect to the vessel head 20. In this case, it is assumed that a head flange 22 includes the above mentioned O-ring grooves and is provided with two polishing wheels (one per groove) along with an oscillating polisher for the horizontal surfaces between and/or adjacent the grooves.

The arm 16, on which the polishing device 14 is supported, is provided with a counter weight 24 which biases the polisher upward into contact with the flange. By adjusting either the mass of the counter weight 24 or the distance of the weight 24 from the axis about which the arm is rotatable, the force with which the polisher 14 is pressed against the flange can be selectively controlled.

In this embodiment, the sensor which determines if the polisher is moving along the flange can be mounted on the support 18 on which the arm is mounted, or operatively connected with a roller which is provided on the polishing unit per se.

A motor 26 is preferably mounted on the support and arranged to drive the arm about its axis of rotation. This allows the operator to minimize the amount of time spent under the radioactive head 20. After setting up the polisher in the position illustrated in FIG. 5 and initiating rotation of the arm 16, either by manually moving the arm or energizing the arm drive motor, the operator is free to vacate the area until such time as inspection of the polishing is necessary.

In this instance also, a vacuum hose and power cables (not illustrated in this figure) are suitably supported by the arm. In this embodiment, it is not outside the scope of the invention to arrange the arm to reverse direction each 360° of rotation. This simplifies the hose/power cable connection arrangement and avoids possible tangling problems.

Figure 6:
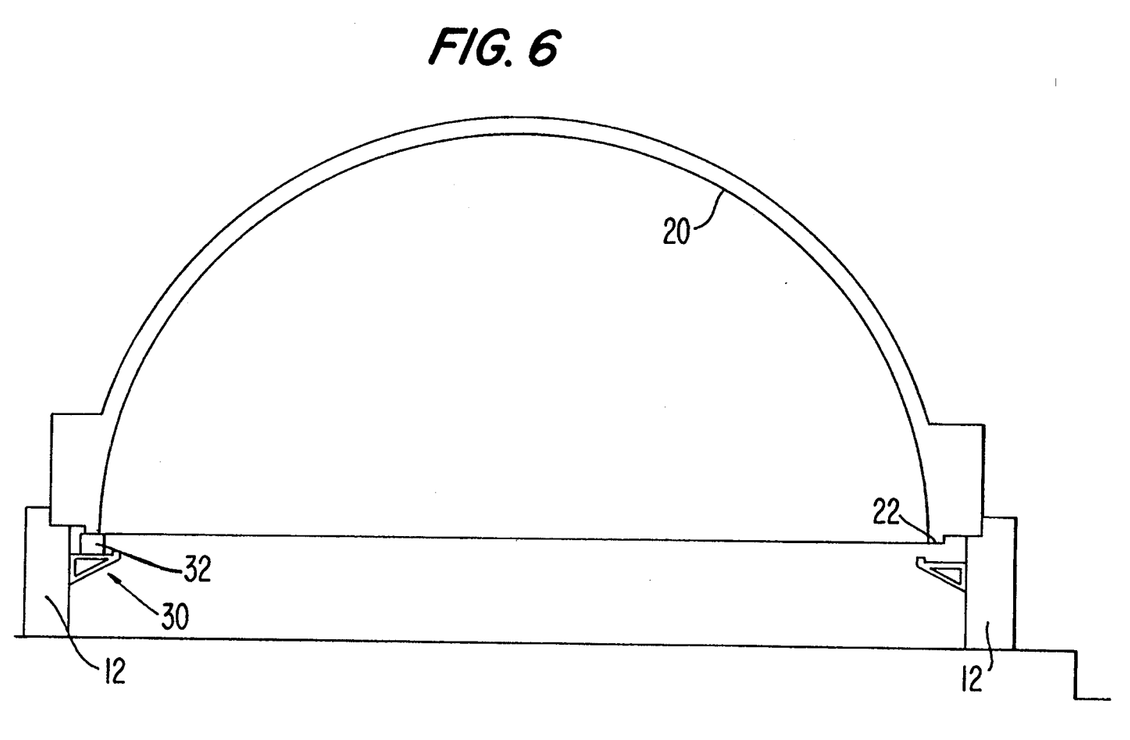
FIG. 6 is an elevational view schematically showing a trolley-type polishing arrangement according to a third embodiment of the invention which is used to polish the flange of the head while it is supported on pedestals.
Figure 7:
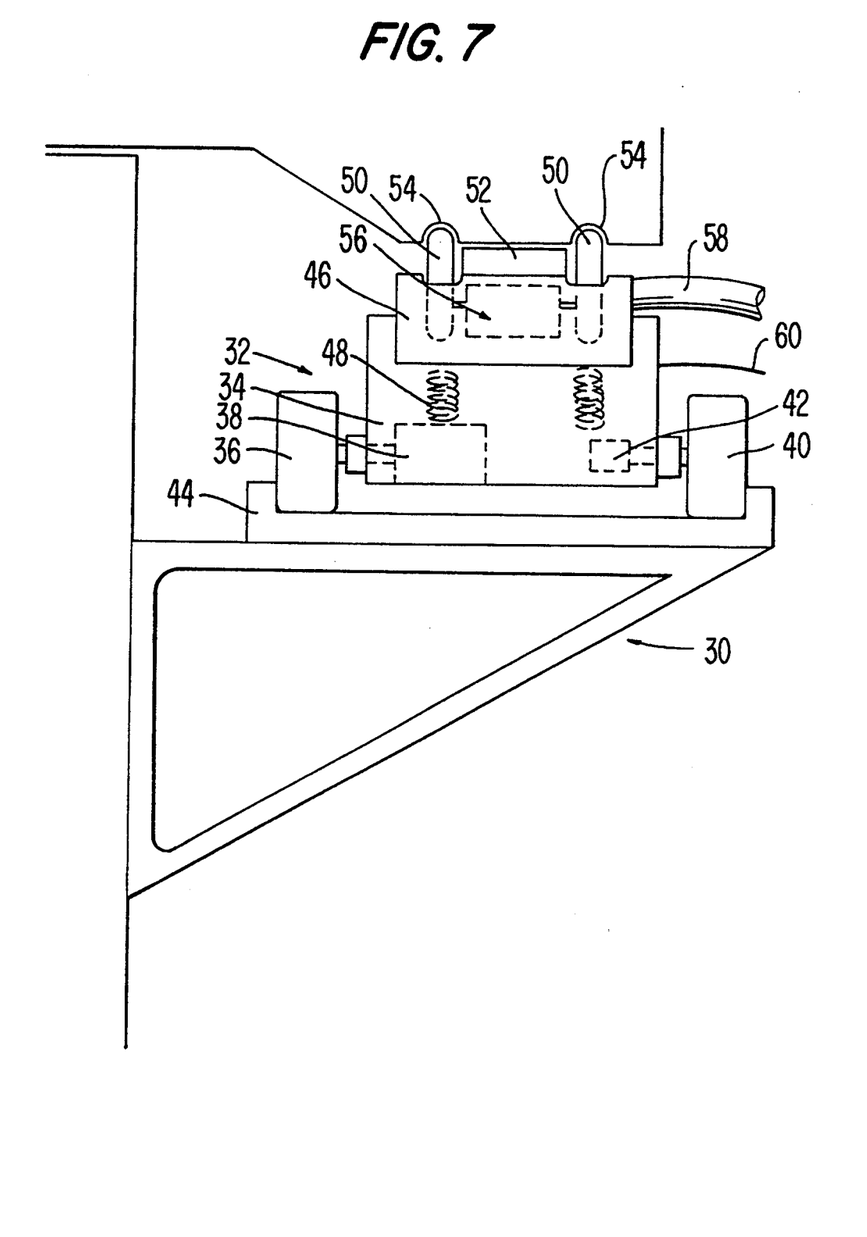
FIG. 7 is an elevational view depicting an example of a polishing machine which is adapted to run along the annular track supported on the head support pedestals, in accordance with the second embodiment of the present invention.

FIGS. 6 and 7 show a third embodiment of the invention. In this arrangement a track 30 is supported on the inboard sides of the pedestals 12, and a trolleylike polishing vehicle 32 (shown in detail in FIG. 7) adapted traverse the track while polishing the grooves and surfaces of the flange adjacent said grooves.

The vehicle illustrated in FIG. 7 comprises a wheeled cart 34 having one or more wheels 36 in a drive connection with an electric motor 38 and at least one non-driven wheel 40 operatively connected with a rotation sensor 42. The cart 34 is adapted to travel along grooved guide portion 44 of the track. A polishing unit 46 is resiliently supported on the cart 34. In this instance, coil springs 48 are shown biasing the polishing unit 46 upwardly into engagement with the head flange. The polishing unit is provided with two polishing wheels 50 and an oscillating type polisher 52 between the two wheels. With this arrangement, the interior of the grooves and the area which spans between the grooves, are simultaneously polished. A motor arrangement generally denoted by 56 is used to drive both the polishing wheels 50, 50 and the oscillating polisher 52.

A vacuum hose 58 and power cable 60 are connected to the polisher and the cart in the illustrated positions.

It will of course be appreciated that while the cart 34 is shown in FIG. 7 with the one of the outboard wheels in drive connection with an electric motor, and the polishing unit 46 suspended by simple coil springs, the present invention is by no way limited to such an arrangement and a large number of variations can be envisaged for carrying out the invention. Simply by way of example, it could be arranged so that the vertically oriented polishing wheels could be followed by a horizontal wheel of the nature illustrated in FIG. 3 so that surfaces outboard of the two groove could also be cleaned and polished at the same time as the surface between the grooves.

What is claimed is:

1. A circular flange polishing arrangement comprising:
    selectively energizable polishing means;
    guide means for guiding the polishing means in a predetermined polishing pattern with respect to a surface on said flange to be polished; and
    means for sensing movement of said polishing element relative to the surface of said flange to be polished and for enabling the polishing element to be energized when relative movement is detected.

2. A circular flange polishing arrangement as set forth in claim 1, wherein said guide means comprises:
    a frame member on which said polishing means is supported; and
    a support roller mounted on said frame member, said support roller being arranged to roll along a surface which has a predetermined relationship with the surface of said flange which is to be polished.

3. A circular flange polishing arrangement as set forth in claim 2, wherein said surface along which said support roller is arranged to roll comprises a circular track which is supported on a plurality of pedestal members which support a body on which the circular flange to be polished is formed.

4. A circular flange polishing arrangement as set forth in claim 3, wherein said polishing means comprises a first polishing wheel which is received in a first groove formed in a surface of the flange.

5. A circular flange polishing arrangement as set forth in claim 4, wherein said polishing means further comprises a second polishing wheel which is received in a second groove formed in the surface of the flange.

6. A circular flange polishing arrangement as set forth in claim 5, wherein said polishing means further comprises an oscillating polisher which is arranged to polish a surface which is located between the first and second grooves in which said first and second polishing wheels are received.

7. A circular flange polishing arrangement as set forth in claim 1, wherein said guide means comprises a support arm on which said polishing means is supported, said support arm being pivotally mounted on a support disposed essentially coaxial with the flange to be polished.

8. A circular flange polishing arrangement as set forth in claim 1, wherein said polishing means comprises an oscillating polisher.

9. An polishing arrangement for polishing an annular flange comprising:
    an essentially triangular frame having first, second and third apexes, said frame being so dimensioned that, when disposed in an operative relationship with said annular flange, said first, second and third apexes are located proximate said annular flange;
    first and second support means disposed at each of said first and second apexes, respectively, for supporting said frame on said annular flange;
    polishing means disposed at said third apex of said frame, for polishing a surface of said annular flange; and
    sensing means for sensing relative movement between said frame and said annular flange and for selectively energizing said polishing means in response to the detection of relative movement.

10. An annular flange polishing arrangement comprising:
    a stationary support;
    an arm pivotally supported on said support;
    selectively energizable polishing means mounted proximate the free end of said am for polishing a surface of said annular flange;
    biasing means associated with said arm for biasing said polishing means into engagement with the surface of said annular flange to be polished; and
    means for sensing movement of said polishing element relative the surface of said flange to be polished and for enabling the polishing element to be energized when relative movement is detected.

11. An annular flange polishing arrangement as set forth in claim 10, wherein said stationary support is disposed about in the middle of a plurality of pedestal members on which a body, of which said annular flange forms a part, is supported, and wherein said biasing means biases said polishing means upwardly into engagement with the surface of said flange to be polished.

12. A polishing arrangement for polishing an annular flange comprising:
    a track, said track being supported on a plurality of pedestals which support a member on which the flange is formed;
    a vehicle which is guided by said track along a path which follows the flange;
    polishing means supported on said vehicle so as to engage a surface of said flange which is to be polished; and
    means included in one of said vehicle and said polishing means for sensing the movement of said vehicle with respect to said flange and for permitting said polishing means to be energized to polish the surface of said flange.

* * * * *